United States Patent
Radford et al.

(10) Patent No.: US 12,292,924 B2
(45) Date of Patent: May 6, 2025

(54) AUTOMATION OF DIFFERENTIAL MEDIA UPLOADING

(71) Applicant: Disney Enterprises, Inc., Burbank, CA (US)

(72) Inventors: Michael A. Radford, Bainbridge Island, WA (US); Pierre-Anthony Stivell Lemieux, San Mateo, CA (US); Anil Chakrahari, Burbank, CA (US); Christian Parker, Louisville, CO (US); Mitchel C. Jacobs, Malibu, CA (US); Michael Fernandez, Los Angeles, CA (US); Larry Barker, Santa Clarita, CA (US); Benjamin Eric Pearson, Berkeley, CA (US)

(73) Assignee: Disney Enterprises, Inc., Burbank, CA (US)

( * ) Notice: Subject to any disclaimer, the term of this patent is extended or adjusted under 35 U.S.C. 154(b) by 205 days.

(21) Appl. No.: 18/123,644

(22) Filed: Mar. 20, 2023

(65) Prior Publication Data

US 2024/0320264 A1  Sep. 26, 2024

(51) Int. Cl.
*G06F 16/732* (2019.01)
*G06F 16/74* (2019.01)
*H04N 21/262* (2011.01)

(52) U.S. Cl.
CPC ........ *G06F 16/7328* (2019.01); *G06F 16/743* (2019.01); *H04N 21/26258* (2013.01)

(58) Field of Classification Search
CPC .............. G06F 16/7328; G06F 16/743; H04N 21/26258
See application file for complete search history.

(56) References Cited

U.S. PATENT DOCUMENTS

| 2010/0110200 | A1* | 5/2010 | Lau | H04N 21/4325 348/207.1 |
| 2010/0138668 | A1* | 6/2010 | Tsuria | H04H 60/23 340/5.83 |
| 2012/0128058 | A1* | 5/2012 | Bakharov | H04N 21/85406 375/E7.026 |
| 2018/0077170 | A1* | 3/2018 | Glazner | H04N 21/4623 |

(Continued)

OTHER PUBLICATIONS

"Image Hash 4.3.1" Sep. 28, 2022 7 Pgs.

(Continued)

*Primary Examiner* — Farzana Hossain
(74) *Attorney, Agent, or Firm* — Farjami & Farjami LLP

(57) ABSTRACT

A differential media uploading system includes a hardware processor and a memory storing software code. The hardware processor executes the software code to receive a timeline file including a playlist track for a video file, and determine whether any pre-existing video frames stored in a media mastering system include a respective image depicted by a video frame contained in the video file. When it is determined that any of the pre-existing video frames include the respective image, the hardware processor executes the software code to disregard the video frame. When it is determined that none of the pre-existing video frames include the respective image, the hardware processor executes the software code to encode the video frame to provide an encoded video frame and upload the encoded video frame to the media mastering system.

20 Claims, 4 Drawing Sheets

(56) References Cited

U.S. PATENT DOCUMENTS

2019/0354766 A1\* 11/2019 Moore ................. G06V 30/153
2022/0130427 A1\* 4/2022 Allibhai .................. G10L 25/57

OTHER PUBLICATIONS

"Image Format and Characteristics" 1999 ImageMagick Studio LLC 3 Pgs.
"SignatureImage" ImageMagick 1999 Studio LLC 1 Pg.

\* cited by examiner

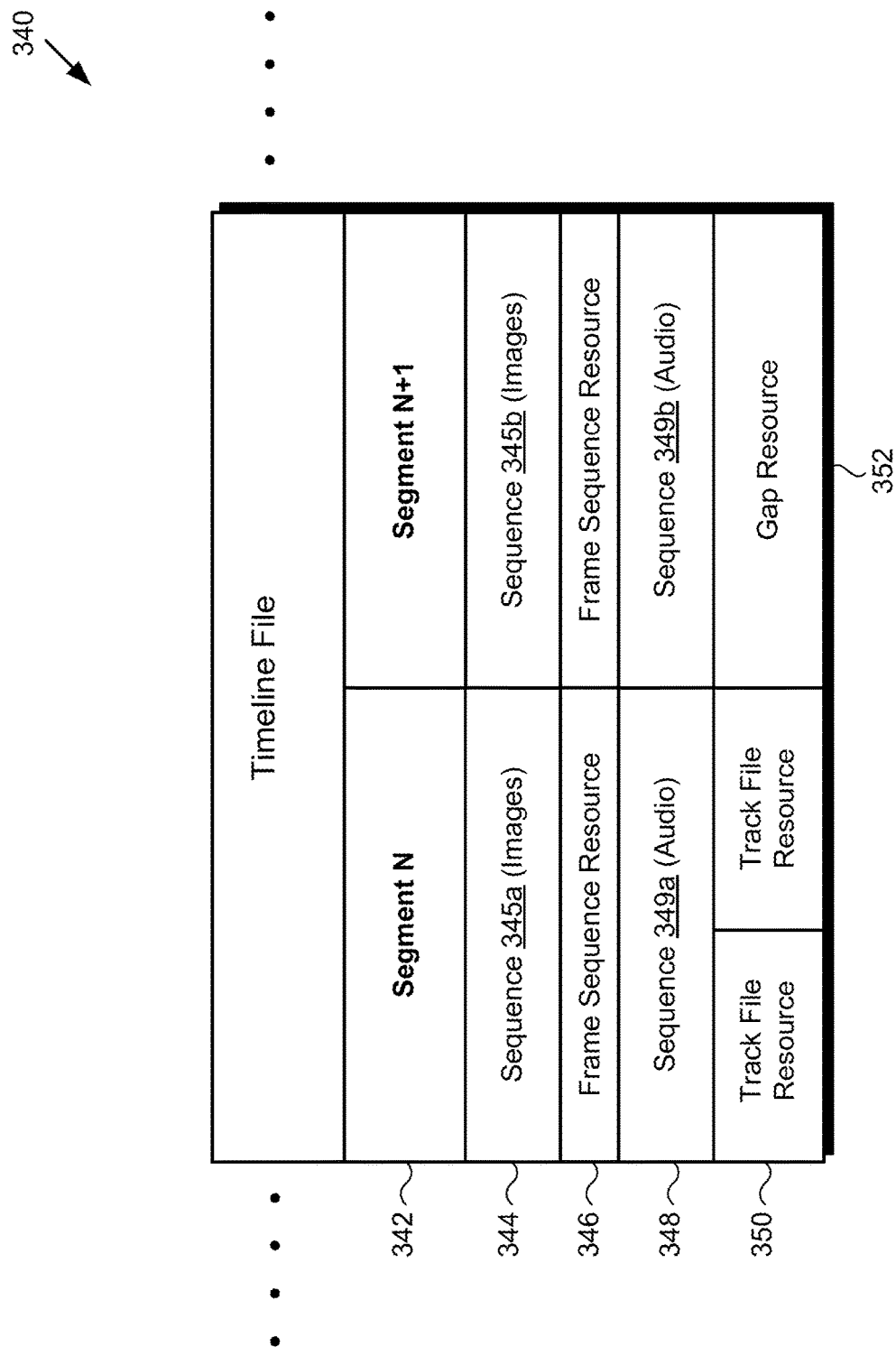

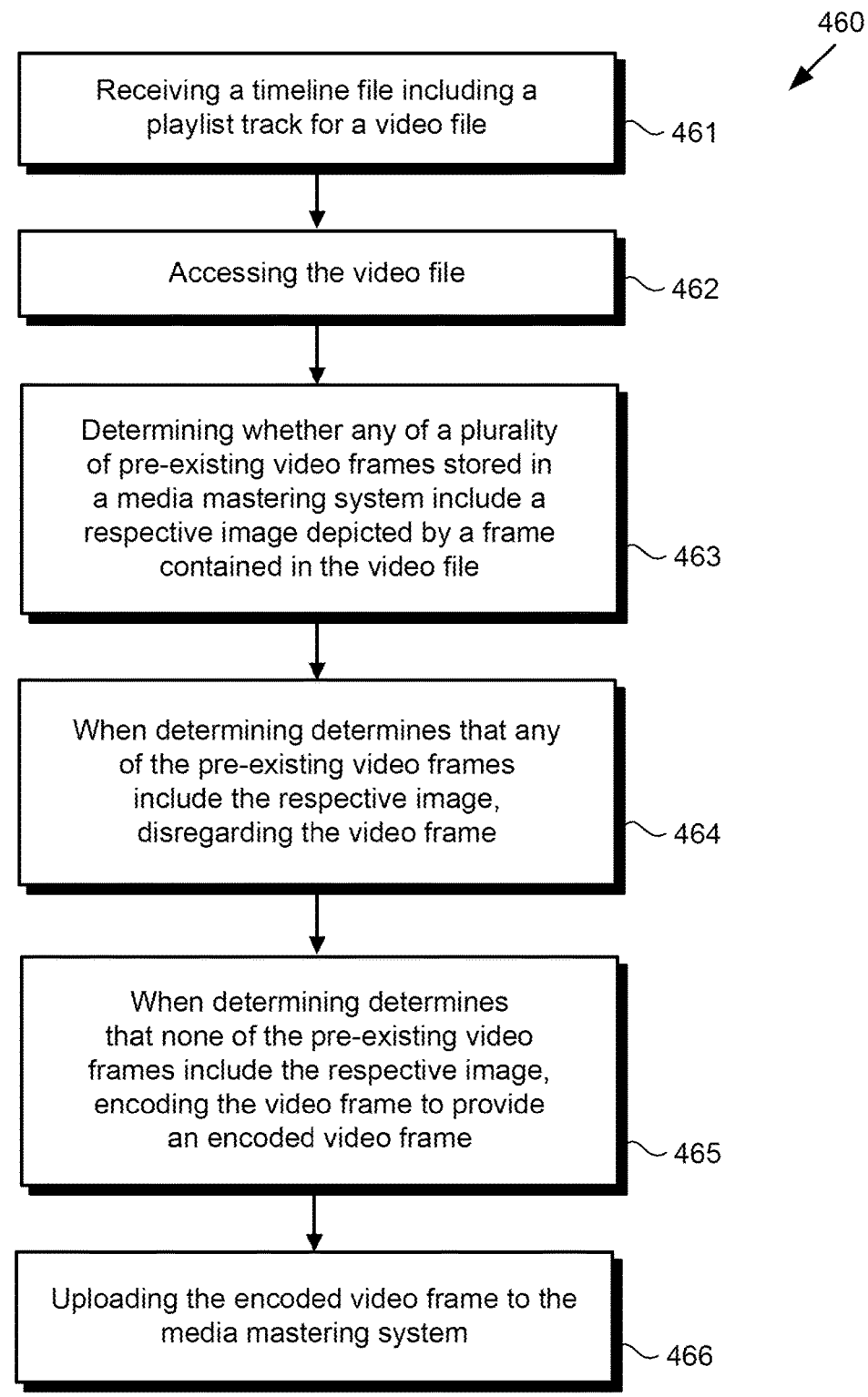

AUTOMATION OF DIFFERENTIAL MEDIA UPLOADING

BACKGROUND

An Editorial Timeline (hereinafter also a "timeline file") is a data structure that describes a complete media experience, including any combination of video, audio, timed text, and the like. The purpose of a timeline file is to assemble and sequence all of those underlying media components into a single media program.

However, in order to distribute numerous localized versions of media content, hundreds of distinct timeline files may have to be assembled for a given title, each timeline file defining a complete and unique experience of the title that meets the requirements of each distribution locality. Each of those timeline files may differ slightly in the makeup of the video frame sequences, due to local censorship requirements, localized imagery for a given geographical region, or both. The same is true of the audio experience, where dubbed audio may be used. Analogously, timed text may be added or changed depending on the requirements in each locale.

The process of defining, ingesting, modifying, and distributing these various timeline files can be complex and typically includes a high degree of redundant underlying media content across each timeline file instance. Conventional timeline file formats make reference to the underlying video, sound and subtitle media using file-system semantics. Although that approach is convenient for small local editorial applications, it is ill suited to large-scale media mastering environments for which the recognition of redundant content is important for efficiency. For example, because file paths can change in a particular environment over time, and because different file systems can refer to the same media content using different paths and different names, large scale media mastering systems may undesirably be forced to upload existing timeline files substantially in their entirety. That is to say, conventional timeline file formats with their file-system semantics disadvantageously fail to support differential or incremental uploads, as well as failing to recognize media content redundancy.

BRIEF DESCRIPTION OF THE DRAWINGS

FIG. 3 shows a more detailed diagram of a portion of a timeline file, according to one implementation; and FIG. 4 shows a flowchart presenting an exemplary method for use by a system to automate differential media uploading, according to one implementation.

DETAILED DESCRIPTION

Figure 1:
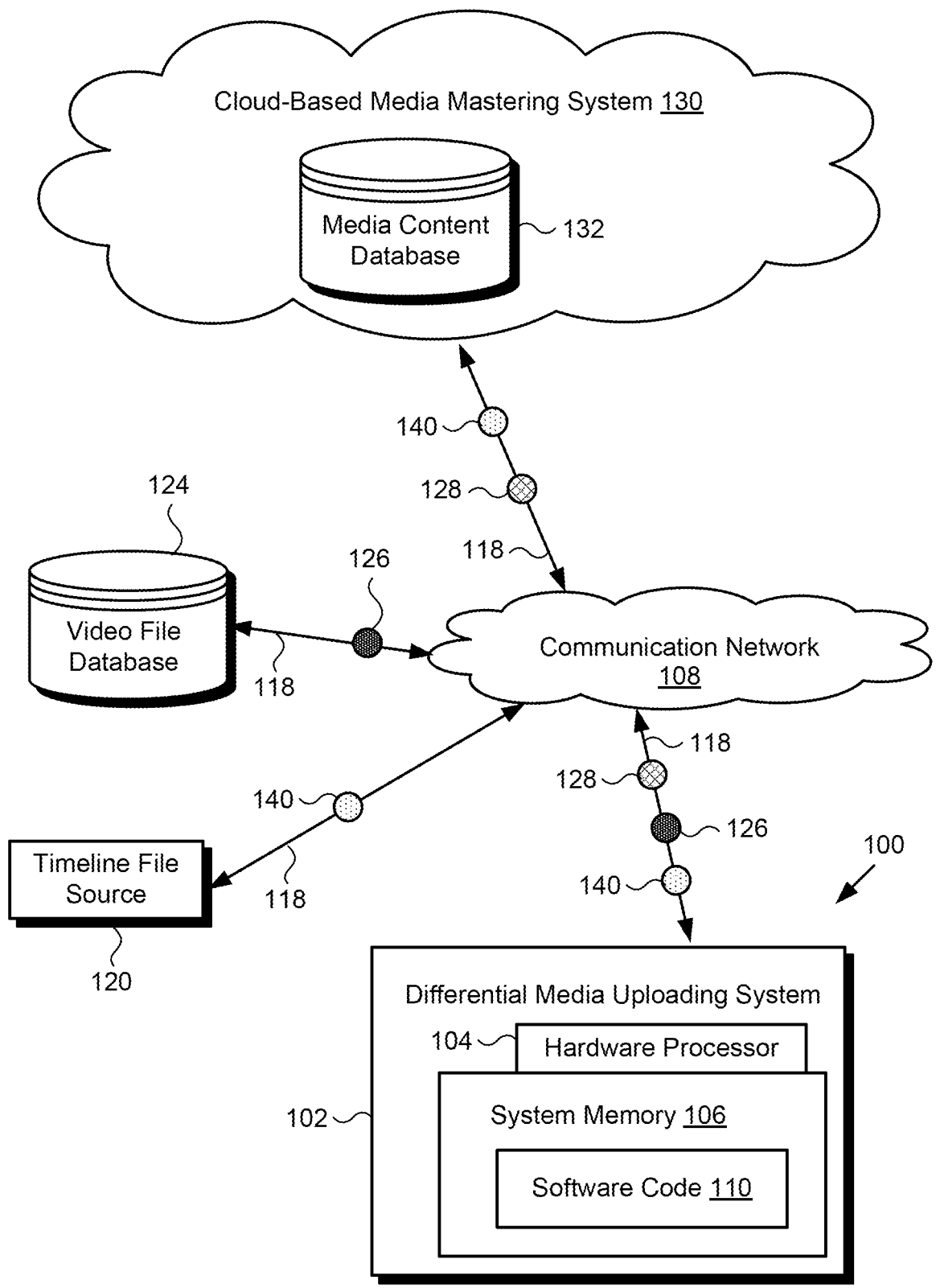
FIG. 1 shows an exemplary system for automating differential media uploading, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As stated above, an Editorial Timeline (hereinafter "timeline file") is a data structure that describes a complete media experience, including any combination of video, audio, timed text, and the like. The purpose of a timeline file is to assemble and sequence all of those underlying media components into a single media program. In order to distribute numerous localized versions of media content, hundreds of distinct timeline files may have to be assembled by a media production facility for a given title, each timeline file defining a complete and unique experience of the title that meets the requirements of each distribution locality. Despite the uniqueness of each different timeline file, the differences between timeline files are often slight when compared to the amount of underlying media content referenced in common by each timeline file instance. In other words, there is typically significant redundancy in the media content sequences described by different timeline files.

Conventional timeline file formats make reference to the underlying video, sound and subtitle media using file-system semantics. Although that approach is convenient for small local editorial applications, it is ill suited to large-scale media mastering environments for which the recognition of redundant content is important for efficiency. For example, because file paths can change in a particular environment over time, and because different file systems can refer to the same media content using different paths and different names, large scale media mastering systems may undesirably be forced to upload existing timeline files substantially in their entirety. That is to say, conventional timeline file formats with their file-system semantics fail to support differential or incremental uploads, as well as failing to recognize media content redundancy.

The present application discloses systems and methods for automating differential media uploading. The automated differential media uploading solution disclosed by the present application advances the state-of-the-art by providing a video frame based approach to identifying redundant content referenced by different timeline files, exclusive of the file-system semantics relied upon in the conventional art. Thus, the timeline files utilized by the automated differential media uploading solution disclosed herein are exclusively video frame based and independent of file-system semantics such as file names, file systems, file metadata, or where a media file resides.

It is noted that, as defined for the purposes of the present application, the terms "automation," "automated," and "automating" refer to systems and processes that do not require the participation of a human system administrator. Although in some implementations the differential uploading determinations made by the systems and methods disclosed herein may be reviewed or even modified by a human system administrator, that human involvement is optional. Thus, the methods described in the present application may be performed under the control of hardware processing components of the disclosed systems.

It is also noted that the types of media content to which the present automated differential media uploading solution may be applied include audio-video content having both audio and video components, audio unaccompanied by video, and video unaccompanied by audio. In addition, or alternatively, in some implementations, the type of media content to which the present novel and inventive differential uploading solution can be applied may be or include digital representations of persons, fictional characters, locations, objects, and identifiers such as brands and logos, for example, which populate a virtual reality (VR), augmented reality (AR), or mixed reality (MR) environment. Moreover, that content may depict virtual worlds that can be experienced by any number of users synchronously and persistently, while providing continuity of data such as personal identity, user history, entitlements, possessions, payments, and the like. It is noted that the automated differential media uploading solution disclosed by the present application may also be applied to content that is a hybrid of traditional audio-video and fully immersive VR/AR/MR experiences, such as interactive video.

FIG. 1 shows exemplary differential media uploading system 100, according to one implementation. As shown in FIG. 1, differential media uploading system 100 includes computing platform 102 having hardware processor 104, and system memory 106 implemented as a computer-readable non-transitory storage medium. According to the present exemplary implementation, system memory 106 stores software code 110.

As further shown in FIG. 1, differential media uploading system 100 may be implemented in a use environment including timeline file source 120, such as a media production facility for example, video file database 124, and media mastering system 130, which may be an automated and cloud-based media mastering system, including media content database 132. In addition, FIG. 1 shows network communication links 118 communicatively coupling timeline file source 120, video file database 124, and media mastering system 130 with differential media uploading system 100 via communication network 108. Also shown in FIG. 1 is timeline file 140 received by differential media uploading system 100 from timeline file source 120; video file 126; and at least one encoded video frame 128 (hereinafter "encoded video frame(s) 128") that may be uploaded to media mastering system 130 along with timeline file 140 by differential media uploading system 100.

Although the present application refers to software code 110 as being stored in system memory 106 for conceptual clarity, more generally, system memory 106 may take the form of any computer-readable non-transitory storage medium. The expression "computer-readable non-transitory storage medium," as defined in the present application, refers to any medium, excluding a carrier wave or other transitory signal that provides instructions to hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

It is further noted that although FIG. 1 depicts software code 110 as being located in a single instance of system memory 106 that representation is also merely provided as an aid to conceptual clarity. More generally, differential media uploading system 100 may include one or more computing platforms, such as computer servers for example, which may be co-located, or may form an interactively linked but distributed system, such as a cloud-based system, for instance. As a result, hardware processor 104 and system memory 106 may correspond to distributed processor and memory resources within differential media uploading system 100. Thus, it is to be understood that software modules included in software code 110 and described in greater detail below by reference to FIG. 2 may be stored remotely from one another within the distributed memory resources of differential media uploading system 100.

Hardware processor 104 may include multiple hardware processing units, such as one or more central processing units, one or more graphics processing units, and one or more tensor processing units, one or more field-programmable gate arrays (FPGAs), custom hardware for machine-learning training or, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 110, from system memory 106, while a GPU may be implemented to reduce the processing overhead of the CPU by performing computationally intensive graphics or other processing tasks. A TPU is an application-specific integrated circuit (ASIC) configured specifically for AI applications such as ML modeling.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network. In addition, or alternatively, in some implementations, differential media uploading system 100 may utilize a local area broadcast method, such as User Datagram Protocol (UDP) or Bluetooth, for instance. Furthermore, in some implementations, differential media uploading system 100 may be implemented virtually, such as in a data center. For example, in some implementations, differential media uploading system 100 may be implemented in software, or as virtual machines. Moreover, in some implementations, communication network 108 may be a high-speed network suitable for high performance computing (HPC), for example a 10 GigE network or an Infiniband network.

Figure 2:
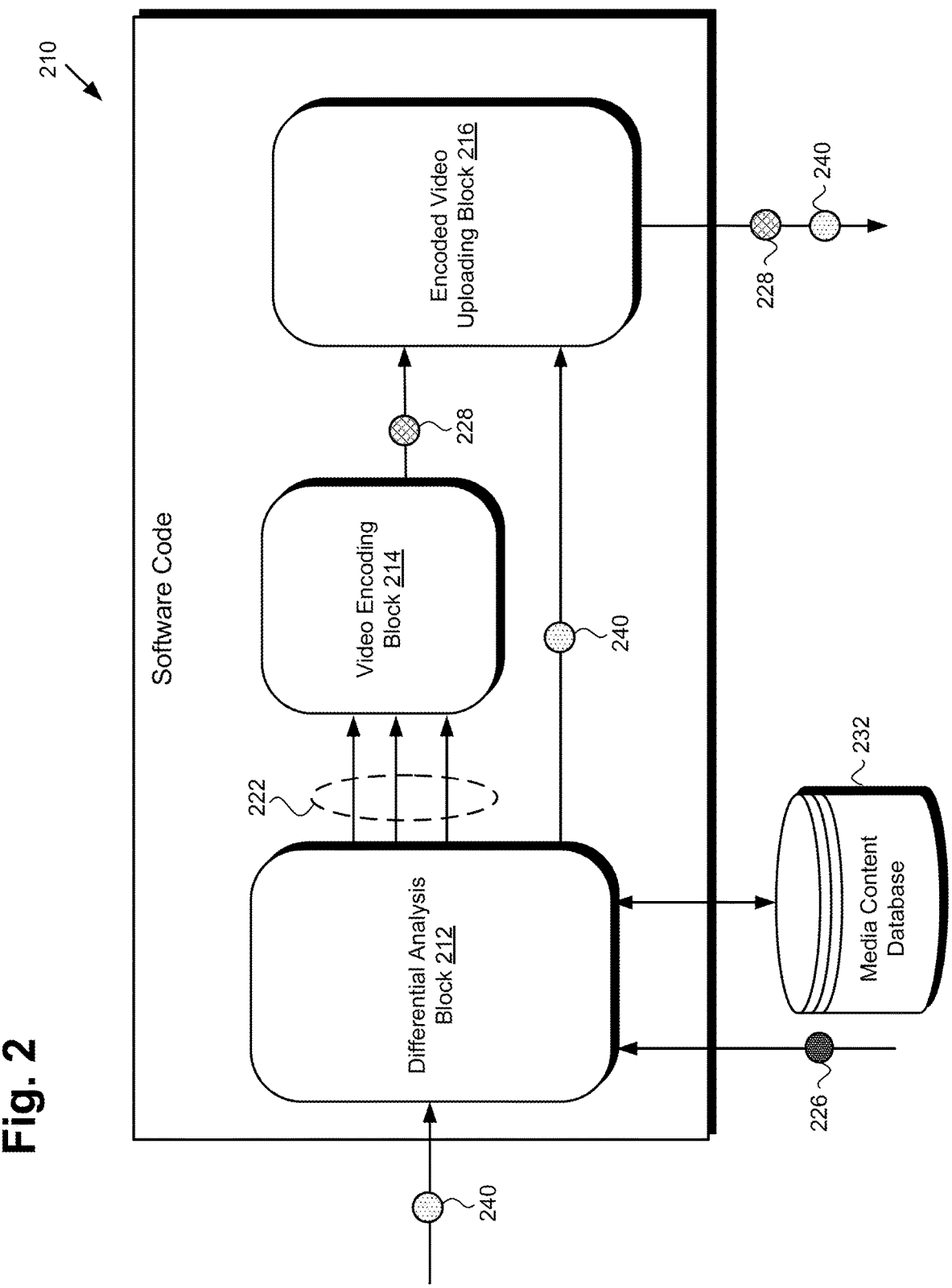
FIG. 2 shows a block diagram of an exemplary software code suitable for use by the system shown in FIG. 1, according to one implementation.

FIG. 2 shows a diagram of exemplary software code 210 suitable for use by differential media uploading system 100, in FIG. 1, according to one implementation. As shown in FIG. 2, software code 210 includes differential analysis block 212, video encoding block 214, and encoded video uploading block 216. As further shown in FIG. 2, software code 210 receives timeline file 240 including a playlist track for one or more video frames contained in video file 226 as an input, obtains or otherwise accesses video file 226, communicates with media content database 232 of media mastering system 130 in FIG. 1, selectively encodes at least one video frame 222 (hereinafter "video frame(s) 222") of the one or more video frames contained in video file 226 to provide at least one encoded video frame 228, and outputs timeline file 240, and optionally at least one encoded video frame 228 (hereinafter "encoded video frame(s) 228") as uploads to media mastering system 130.

Software code 210, timeline file 240, video file 226, media content database 232, and encoded video frame(s) 228 correspond respectively in general to software code 110, timeline file 140, video file 126, media content database 132, and encoded video frame(s) 128, in FIG. 1. Consequently, software code 110, timeline file 140, video file 126, media content database 132, and encoded video frame(s) 128 may share any of the characteristics attributed to respective software code 210, timeline file 240, video file 226, media content database 232, and encoded video frame(s) 228 by the present disclosure, and vice versa. That is to say, like software code 210, software code 110 may include features corresponding respectively to differential analysis block 212, video encoding block 214, and encoded video uploading block 216.

FIG. 3 shows a more detailed diagram of a portion of timeline file 340, according to one implementation. Timeline file 340 corresponds in general to timeline files 140/240 in FIGS. 1 and 2. Consequently, timeline file 140/240 may share any of the characteristics attributed to timeline file 340 by the present disclosure, and vice versa.

At the highest level, and as defined for the purposes of the present application, timeline file 140/240/340 includes one or more playlist tracks or "sequences," which may be reproduced in parallel. Each playlist track includes an uninterrupted sequence of audio-visual samples of a single kind. For example, playlist track 344 is a sequence of only video frames, while playlist track 348 is a sequence of only audio samples. It is noted that the sequence of audio samples included in playlist track 348 may be ignored when performing the automated differential media uploading solution disclosed by the present application.

Video content includes individual video frames that can identified as belonging to a particular shot, scene, or reel. As used in the present application, the term "reel," as applied to video content refers to a specific time duration of the video content, such as twenty minutes, or any other specific time duration that typically spans one or more scenes. A "scene" is a shot or series of shots that together deliver a single, complete and unified dramatic element of film narration, or block of storytelling within a film. Moreover, the term "shot" refers to a sequence of frames of video that are captured from a unique camera perspective without cuts or other cinematic transitions.

All playlist tracks within a timeline file have identical duration. Timeline file 140/240/340, and thus its playlist tracks, is/are subdivided temporally into one or more contiguous segments 342. Segments 342 can be used, for example, to capture reel boundaries. Each segment 342 may contain a collection of video frame sequences 345a, 345b and audio sequences 349a, 349b that are reproduced in parallel.

There is a unique mapping of each sequence in a segment to each playlist track in the timeline: each sequence in each segment corresponds to a single playlist track. Each sequence includes an uninterrupted sequence of audio-visual samples of a single kind, i.e., video frames or audio samples. A sequence may be further subdivided into a series of resources that are reproduced sequentially and without gaps. Each resource can be used, for example to capture shot boundaries. A resource is the atomic element of the timeline file and selects samples from an underlying media content. Examples of resources include track file resource 350 that selects a sequence of audio-visual samples within a media file (e.g., a Material Exchange Format (MXF) file), frame sequence resource 346 that selects a sequence of audio-visual samples contained in a series of individual media files, gap resource 352 that indicates the absence of content (i.e., if the content is not yet available), and a markers resource (not shown in FIG. 3) that contains metadata labels associated with specific temporal locations on the timeline file (e.g., a first frame of action).

A timeline file is typically immutable, i.e., once created it cannot be modified. Instead, when a localized edit is authored or a shot corrected, a new timeline file is created. In order to differentiate between a timeline file that is a corrected version of a particular version of the content and one that is a new version of the content, each timeline file contains a single identifier (the contentID property), that links it to a record in an external content identification system. Two timeline files with the same contentID are two versions of the same content, whereas two timelines files with different contentIDs represent two different contents. The relationship between the contents of two timeline files is therefore determinable using the external content identification system. In fact, other than technical data embedded within media files, e.g., video frame color space, a timeline file does not contain information on the audio-visual material it references. This minimalistic approach to content identification within the data model advantageously simplifies it while allowing a complete history of each timeline file to be queried and retrieved.

The functionality of software code 110/210 will be further described by reference to FIG. 4. FIG. 4 shows flowchart 460 presenting an exemplary method for use by a system to automate differential media uploading, according to one implementation. With respect to the method outlined in FIG. 4, it is noted that certain details and features have been left out of flowchart 460 in order not to obscure the discussion of the inventive features in the present application.

Referring to FIG. 4, with further reference to FIGS. 1, 2, and 3, flowchart 460 includes receiving timeline file 140/240/340 including playlist track 344 for video file 126/226 (action 461). It is noted that playlist track 344 for video file 126/226 is exclusively video frame based and omits reference to file data of video file 126/226 or metadata included in video file 126/226. That is to say playlist track 344 may be exclusively video frame based and independent of filesystem semantics of video file 126/226, such as the file name of video file 126/226, the file system of video file 126/226, file metadata of video file 126/226, or a data storage location video file 126/226.

Moreover, and as shown by FIG. 3 with further reference to FIG. 2, in some implementations timeline file 140/240/340 may include a plurality of parallel playlist tracks including playlist track 344 for video frame(s) 222, where the plurality of parallel playlist tracks are exclusively video frame based and omit reference to file data of video file 126/226 or metadata included in video file 126/226. Timeline file 140/240/340 may be received from timeline file source 120 via communication network 108 and network communication links 118, in action 461, by software code 110/210 of differential media uploading system 100, executed by hardware processor 104, and using differential analysis block 212.

Continuing to refer to FIG. 4 in combination with FIGS. 1, 2, and 3, in some implementations, the method outlined by flowchart 460 may further include accessing video file 126/226 (action 462). In some implementations, action 462 may include merely accessing video file 126/226 stored on video file database 124. However, in other implementations, action 462 may include obtaining video file 126/226 from video file database 124. Video file 126/226 may be obtained or otherwise accessed in action 462 by software code 110/210 of differential media uploading system 100, executed by hardware processor 104, and using differential analysis block 212. It is noted that action 462 is optional, and in some implementations, may be omitted from the method outlined by flowchart 460

The media content contained by video file 126/226 and referenced by timeline file 140/240/340 may include audio-video content having both audio and video components, audio unaccompanied by video, and video unaccompanied by audio. In addition, or alternatively, in some implementations, such media content may be or include digital representations of persons, fictional characters, locations, objects, and identifiers such as brands and logos, for example, which populate a VR, AR, or MR environment. Moreover, that media content may depict virtual worlds that can be experienced by any number of users synchronously and persistently, while providing continuity of data such as personal identity, user history, entitlements, possessions, payments, and the like. It is noted that video file 126/226 may include content that is a hybrid of traditional audio-video and fully immersive VR/AR/MR experiences, such as interactive video.

Referring to FIG. 4 in combination with FIGS. 1 and 2, the method outlined by flowchart 460 further includes determining whether any of a plurality of pre-existing video frames stored in media mastering system 130 include a respective image depicted by any of video frame(s) 222 (action 463). That is to say, for example, action 463 includes determining, for each of the video frame(s) 222 of video file 126/226, whether the image depicted by that particular video frame is included among any one of a plurality of pre-existing video frames, such as video frames stored on media content database 132/232 of video mastering system 130. It is noted that, in some implementations, the video format of video frame(s) 222 may be an uncompressed Tag Image File Format (TIFF). Action 463 may be performed by software code 110/210 of differential media uploading system 100, executed by hardware processor 104, and using differential analysis block 212.

In some implementations, the determination performed in action 463 may include generating a unique video frame identifier for the each video frame of the plurality of video frames contained by vide file 126/226, using pixels of that respective video frame for example, and comparing the unique video frame identifier with each of a plurality of unique video frame identifiers stored on media content database 132/232 of media mastering system 130. By way of example, generating such a unique video frame identifier for the respective video frame, in action 463, may include computing a raster hash using only pixels of the respective video frame, and may be completely independent of file data or metadata of video file 126/226, as well as any other file-system semantics associated with video file 126/226. Moreover, in some implementations, such a raster hash may take the form of as Secure Hash Algorithm 1 (SHA-1) hash, for example.

Thus, in order to determine whether a particular video frame stored on media content database 132/232 of video mastering system 130 has been altered in the process of producing video file 126/226, instead of using conventional file checksums, the present differential media uploading solution makes use of a raster hash algorithm that effectively separates the raw pixel data of a video frame from other video file data or metadata. Additionally it may be necessary to normalize any bits that lay outside of the desired bit-depth, since mastering tools can arbitrarily set their values in ways that would lead to a hash mismatch where a match would otherwise be expected.

For example, in order to compute a raster hash of a 16-bit video frame (e.g., in the form of an uncompressed TIFF file) with an actual bit-depth "B", height "H", and width "W", the following process flow may be executed: first parse the video file into a linear array ("A") of RGB 16-bit triplets, forming a left-to-right, top-to-bottom raster; second, for each 16-bit value in "A," set the N highest bits to zero (0) where N=16-B; third, form H number of arrays of 3*W 16-bit unsigned integers comprised of horizontal rows taken from "A;" and fourth, compute a SHA1 hash by successively applying each of the H arrays of 16-bit numbers. The resultant SHA1 hash is thereby immune to variations in the unused lower-bits of each pixel, variations in packing structure, as well as variations in inconsequential video frame header metadata.

Continuing to refer to FIG. 4 in combination with FIGS. 1 and 2, the method outlined by flowchart 460 further includes, when the determining performed in action 463 determines that any of the plurality of pre-existing video frames include that respective image, disregarding that video frame (action 464). Merely by way of example, in some implementations, the raster hash generated for each one of the plurality of video frames based on the respective pixels in each video frame may be compared to raster hashes for pre-existing video frames stored on media content database 132/232 of video mastering system 130. When such a comparison reveals that the image is included in a pre-existing video frame stored on media content database, that video frame of the plurality of video frames may be disregarded as being a redundant video frame. Action 464 may be performed by software code 110/210 of differential media uploading system 100, executed by hardware processor 104, and using differential analysis block 212.

Continuing to refer to FIG. 4 in combination with FIGS. 1 and 2, the method outlined by flowchart 460 further includes, when the determining performed in action 463 determines that none of the plurality of pre-existing video frames include that image, encoding the video frame to provide an encoded video frame (action 465). Once again merely by way of example, in some implementations, the raster hash generated for each one of the plurality of video frames based on the respective pixels in each video frame may be compared to raster hashes for video frames stored on media content database 132/232 of video mastering system 130. When such a comparison reveals that the image is not included in a pre-existing video frame stored on media content database 132/232, that one video frame (i.e., one of the plurality of video frames contained in video file 126/226) is not a redundant video frame and should be encoded and uploaded to media mastering system 130. Action 465 may be performed by software code 110/210 of differential media uploading system 100, executed by hardware processor 104, and using video encoding block 214.

It is noted that although flowchart 460 lists action 465 as following action 464, that representation is merely exemplary. In various implementations of the method outlined by flowchart 460, action 465 may precede action 464, may follow action 464, or may be performed in parallel with action 464, i.e., actions 464 and 465 may be performed contemporaneously.

Referring to FIG. 4 in combination with FIGS. 1, 2, and 3, the method outlined by flowchart 460 further includes, uploading timeline file 140/240/340 to media mastering system 130 (action 466). It is noted that, in some implementations, encoded video frame(s) 128/228 may be uploaded to media mastering system 130 as well, in action 466. As shown in FIG. 1, timeline file 140/240/340 and, in some implementations encoded video frame(s) 128/228, may be uploaded to media mastering system 130 via communication network 108 and network communication links 118.

It is noted that although some video frames may be disregarded in action 464, and as a result are not uploaded to media mastering system 130 in action 466, a unique "media ID" for every one of the plurality of video frames is included in timeline file 140/240/340 provided to media mastering system 130, and enables preservation of the ordering of the plurality of video frames despite that fact only a subset of the plurality of video frames are encoded and uploaded to media mastering system 130. The uploading of timeline file 140/240/340 and encoded video frame(s) 128/228 to media mastering system 130, in action 466, may be performed by software code 110/210 of differential media uploading system 100, executed by hardware processor 104, and using encoded video uploading block 216.

With respect to the method outlined by flowchart 460, it is emphasized that actions 461, 462, 463, 464, 465, and 466, or actions 461, 462, 463, 464, 465, and 466 may be performed in an automated process from which human involvement may be omitted.

Thus, the present application discloses systems and methods for automating differential media uploading. The automated differential media uploading solution disclosed by the present application advances the state-of-the-art by providing a video frame based approach to identifying redundant content referenced by different timeline files, exclusive of the file-system semantics relied upon in the conventional art. Thus, the timeline files utilized by the automated differential media uploading solution disclosed herein are exclusively video frame based and are advantageously independent of file-system semantics such as file names, file systems, file metadata, or where a media file resides.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A differential media uploading system comprising:
a hardware processor; and
a system memory storing a software code;
the hardware processor configured to execute the software code to:
receive a timeline file including a playlist track for a video file;
determine whether at least one of a plurality of pre-existing video frames stored in a media mastering system includes a respective image depicted by a first video frame contained in the video file;
when determining determines that the at least one of the plurality of pre-existing video frames includes the respective image, disregard the first video frame; and
when determining determines that none of the plurality of pre-existing video frames includes the respective image, encode the first video frame to provide an encoded first video frame, and upload the encoded first video frame to the media mastering system.

2. The differential media uploading system of claim 1, wherein the hardware processor is further configured to execute the software code to generate a unique video frame identifier for the first video frame, and
wherein determining comprises comparing the unique video frame identifier with each of a plurality of unique video frame identifiers for the pre-existing video frames.

3. The differential media uploading system of claim 1, wherein the hardware processor is further configured to execute the software code to generate a unique video frame identifier for the first video frame by computing a raster hash using only pixels of the first video frame.

4. The differential media uploading system of claim 3, wherein the raster hash comprises a Secure Hash Algorithm 1 (SHA-1) hash.

5. The differential media uploading system of claim 1, wherein a file format of the first video frame is an uncompressed Tag Image File Format (TIFF).

6. The differential media uploading system of claim 1, wherein the playlist track for the video file is exclusively video frame based and omits reference to file data of the video file or metadata included in the video file.

7. The differential media uploading system of claim 1, wherein the timeline file comprises a plurality of parallel playlist tracks including the playlist track for the video file, and wherein the plurality of parallel playlist tracks are exclusively video frame based and omit reference to file data of the video file or metadata included in the video file.

8. A method for use by a differential media uploading system including a hardware processor and a system memory storing a software code, the method comprising:
receiving, by the software code executed by the hardware processor, a first timeline file including a first playlist track for a first video file;
determining, by the software code executed by the hardware processor, that at least one of a plurality of pre-existing video frames stored in a media mastering system includes a first respective image depicted by a first video frame contained in the first video file:
disregarding the video frame contained in the first video file, by the software code executed by the hardware processor; and
receiving, by the software code executed by the hardware processor, a second timeline file including a second playlist track for a second video file;
determining, by the software code executed by the hardware processor, that none of the plurality of pre-existing video frames stored in the media mastering system includes a second respective image depicted by a video frame contained in the second video file:
encoding, by the software code executed by the hardware processor, the video frame contained in the second video file to provide an encoded video frame, and
uploading, by the software code executed by the hardware processor, the encoded video frame to the media mastering system.

9. The method of claim 8, further comprising:
generating, by the software code executed by the hardware processor, a unique video frame identifier for the video frame contained in the second video file; and
wherein determining comprises comparing the unique video frame identifier with each of a plurality of unique video frame identifiers for the pre-existing video frames.

10. The method of claim 8, further comprising:
generating, by the software code executed by the hardware processor, a unique video frame identifier for the video frame contained in the second video file by computing a raster hash using pixels of the video frame.

11. The method of claim 10, wherein the raster hash comprises a Secure Hash Algorithm 1 (SHA-1) hash.

12. The method of claim 8, wherein a file format of the first video frame is an uncompressed Tag Image File Format (TIFF).

13. The method of claim 8, wherein the playlist track for the video file is exclusively video frame based and omits reference to file data of the video file or metadata included in the video file.

14. The method of claim 8, wherein the timeline file comprises a plurality of parallel playlist tracks including the playlist track for the video file, and wherein the plurality of parallel playlist tracks are exclusively video frame based and omit reference to file data of the video file or metadata included in the video file.

15. A non-transitory computer-readable storage medium having stored thereon a software code, which when executed by a hardware processor, instantiates a method comprising:
receiving a timeline file including a playlist track for a video file;
determining whether any of a plurality of pre-existing video frames stored in a media mastering system include a respective image depicted by a first video frame contained in the video file;
when determining determines that any of the plurality of pre-existing video frames include the respective image, disregarding the first video frame;
when determining determines that none of the plurality of pre-existing video frames include the respective image, encoding the first video frame to provide an encoded first video frame, and uploading the encoded first video frame to the media mastering system.

16. The non-transitory computer-readable storage medium of claim 15, further comprising:
generating a unique video frame identifier for the first video frame; and
wherein determining comprises comparing the unique video frame identifier with each of a plurality of unique video frame identifiers for the pre-existing video frames.

17. The non-transitory computer-readable storage medium of claim 15, further comprising:
generating, by the software code executed by the hardware processor, a unique video frame identifier for the first video frame by computing a raster hash using only pixels of the video frame.

18. The non-transitory computer-readable storage medium of claim 15, wherein the raster hash comprises a Secure Hash Algorithm 1 (SHA-1) hash.

19. The non-transitory computer-readable storage medium of claim 15, wherein a file format of the first video frame is an uncompressed Tag Image File Format (TIFF).

20. The non-transitory computer-readable storage medium of claim 15, wherein the playlist track for the video file is exclusively video frame based and omits reference to file data of the video file or metadata included in the video file.

* * * * *